Nov. 17, 1970 J. D. REID 3,541,239

DATA TRANSMITTER UTILIZING A PARALLEL PAIR OF INTERMITTENTLY ENERGIZED TRANSFORMERS WITHOUT SATURATION

Filed April 11, 1968 2 Sheets-Sheet 2

United States Patent Office 3,541,239
Patented Nov. 17, 1970

3,541,239

DATA TRANSMITTER UTILIZING A PARALLEL PAIR OF INTERMITTENTLY ENERGIZED TRANSFORMERS WITHOUT SATURATION

James David Reid, Blackwater, Camberley, England, assignor to English Electric Computers Limited, London, England, a British company Filed Apr. 11, 1968, Ser. No. 720,597
Claims priority, application Great Britain, Apr. 18, 1967, 17,792/67
Int. Cl. H03k *17/02;* H04l *25/02*
U.S. Cl. 178—68 8 Claims

ABSTRACT OF THE DISCLOSURE

A data transmitter which includes two isolating transformers having their output windings connected in parallel and having their input windings intermittently energisable in accordance with a data signal to be transmitted. The intermittent enegisation of the transformers, controlled by the phased pulse trains from two pulse generators, is such that at any instant of time at least one of the transformers is being energised in accordance with the data signal. The duration of each such energisation of a transformer is, however, insufficient for the transformer to saturate so that the transmitter output signal, formed of the output signals of the transformers superimposed in time relation, corresponds to the data signal.

Figure 1:
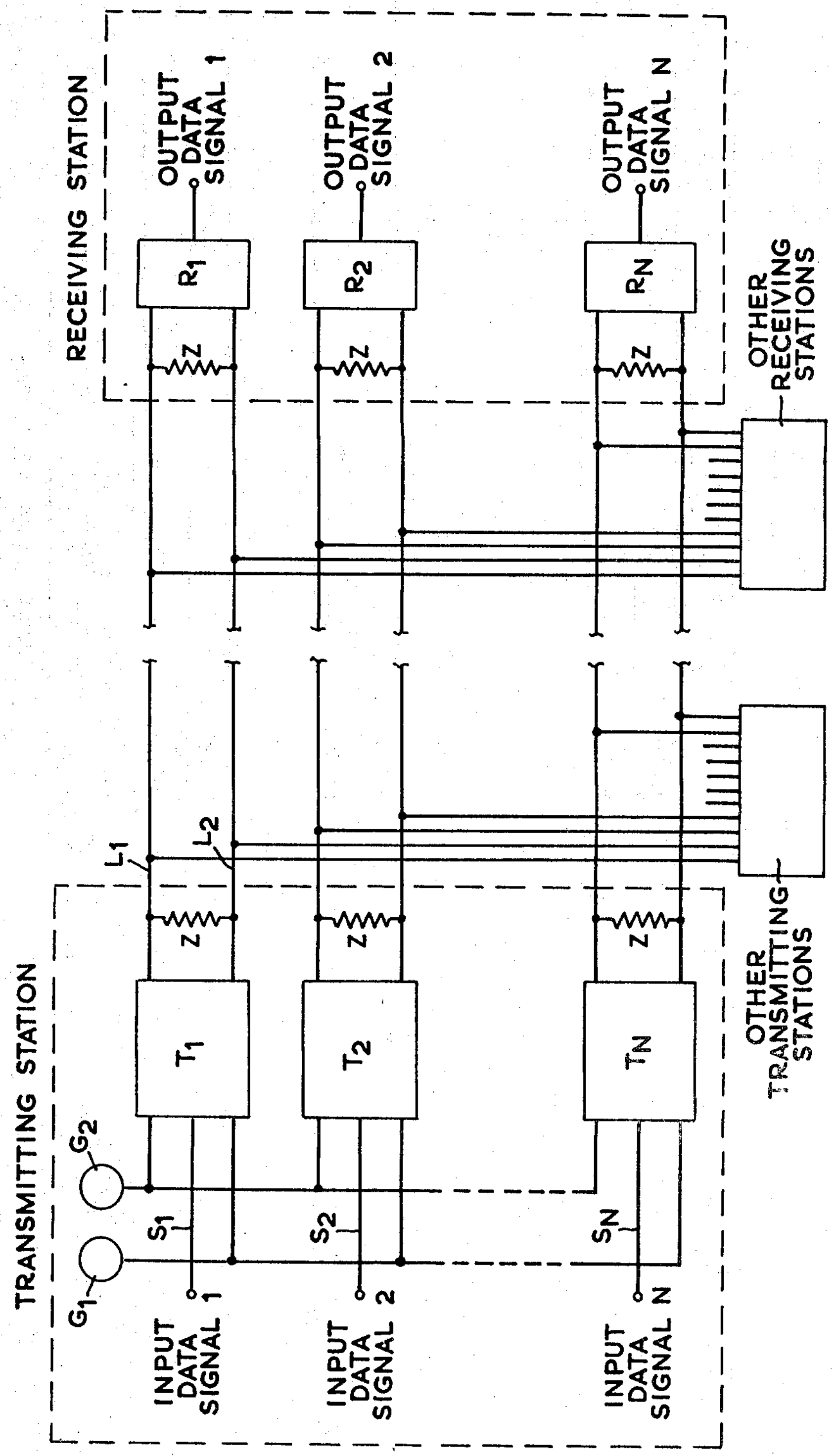

This invention relates to data transmitting apparatus for producing at an output for transmission an output signal portraying a data signal received at an input.

A difficulty occurs with such apparatus with regard to common mode signals which may be impressed on the pair of transmission lines to which the output of the apparatus is connected for operation.

Such signals, which cause the same voltage variation in the two transmission lines of the pair and which may be generated by noise on the transmission lines or by further appartus to which the pair of transmission lines is connected, may, when received by the transmitting apparatus at its output, so affect the operation of the apparatus that it produces spurious signals which are transmitted along the transmission lines and may be interpreted as genuine data.

It is therefore desirable that a data transmitting apparatus for transmitting data along a pair of transmission lines subject to common mode signals shall have good common mode rejection capability, that is to say, it shall not be appreciable affected by common mode signals received at its output.

Previous data transmitting apparatus of the D.C. variety have suffered from the disadvantage that they have had poor common mode rejection due to the direct current paths they provide between their output and earth.

Previous transmitters of the A.C. variety can be arranged to have good common mode rejection but suffer from the disadvantage that two or more cannot readily be arranged for selective operation over the same pair of transmission lines.

The data transmitting apparatus of the present invention has good common mode rejection and yet can readily be arranged selectively to operate with its outputs connected in parallel with one or more other such transmitting apparatus.

According to the invention, a data transmitting apparatus for producing at an output for transmission an output signal portraying a data signal received at an input, comprises at least two isolating transformer means each having an output winding and an input winding magnetically coupled to one another, the output windings being connected in a parallel manner across the output, a gating means for each transformer means, the gating means being connected for effecting energisation of the input windings of the transformer means and being each connected across the input for receiving the data signal, and a pulse generating means which is connected to the gating means for supplying separately thereto pulse trains having repetition frequency, mark/space ratio and relative phase such that at any instant of time during operation of the apparatus a pulse is present in at least one pulse train, each gating means being gated by the pulses of the respective pulse train to effect energisation of the associated said input winding in accordance with the data signal only when the pulses are present, in response to such intermittent energisation each transformer means being effective inductively to generate at its said output winding a pulsed signal which, during a pulse of the respective pulse train, portrays the data signal, the parallel connection of the output windings and the presence, at any instant of time, of a pulse in at least one said pulse train providing that across the output there is produced, as the output signal, a signal which is formed of the pulsed signals superimposed in time relation and which portrays the data signal.

The data signal may be a digital data signal, in which case each gating means may be constituted by an AND gate, or it may be an analogue signal. In either case each transformer means must be such that the time integral of the voltage applied to it by the associated gating means when gated by a pulse from the pulse generating means is insufficient to cause saturation of its magnetic circuit.

According to a preferred feature of the invention, the transmitting apparatus is adapted for operation with a data signal which is unidirectional, and comprises at least one unidirectionally conductive device connected in series with each output winding for preventing interaction between the transformer means at their outputs.

The transmitting apparatus is of particular application to data transmission systems in which data signals may be received from any selected one of two or more transmission apparatus having their outputs connected across the same pair of transmission lines, and in such a transmission system the unidirectionally conductive devices are also effective for providing the transmitting apparatus with a high input impedance to signals across the lines and generated by another such transmitting apparatus.

Preferably a circuit is connected across the input winding of each transformer means for dissipating, during each period of null energisation of the associated transformer means, energy inductively stored in the transformer means during the previous period of energisation.

Figure 2:
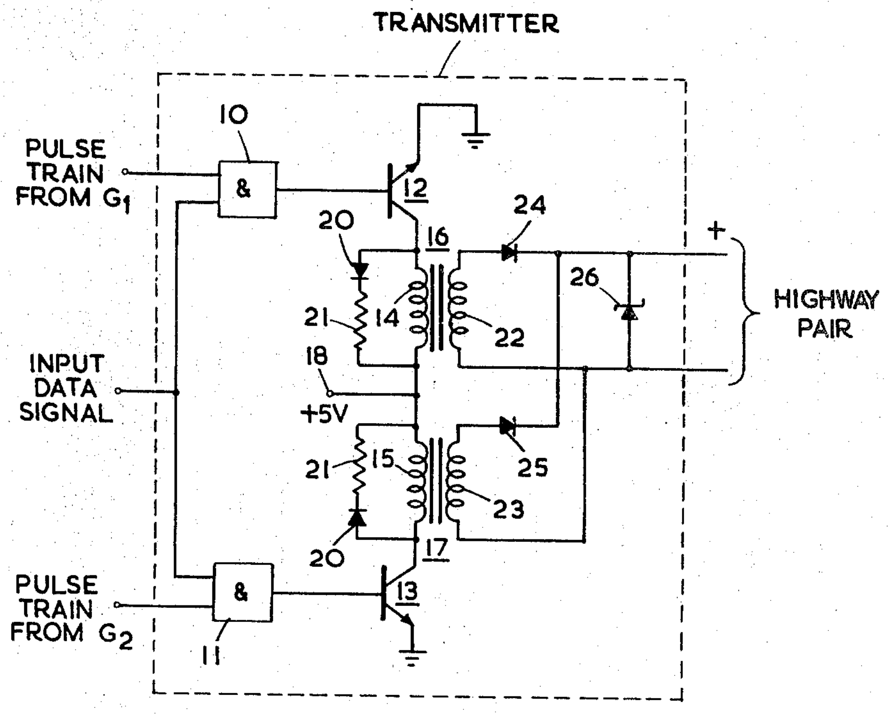
Figure 3:
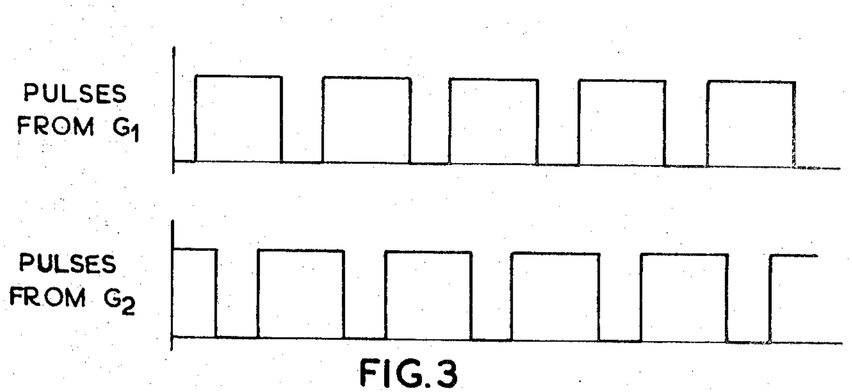

These and other facets of the invention will become apparent from the following description given, by way of example and with reference to the accompanying drawings, of a digital data transmitting apparatus according to the invention and included in a computer interface. In the drawings:

FIG. 1 shows diagrammatically the general circuit arrangement of the computer interface, FIG. 2 shows the circuit diagram of a substantial part of the transmitting apparatus, and FIG. 3 shows the two pulse trains which are involved in the operation of the apparatus of FIG. 2.

Referring now to FIG. 1, the computer interface has a transmitting station and a receiving station connected to the ends of a "data highway" comprising highway pairs of twisted and mutually insulated conductors, the number of pairs provided being determined by the number of items of information required to be transmitted in parallel.

At the transmitting station are N data transmitters $T_1$, $T_2$ . . . $T_N$ each connected for receiving a digital input data signal along a respective line $S_1$, $S_2$ . . . $S_N$, and the continuously generated outputs from two pulse generators $G_1$, and $G_2$ common to all the transmitters of the station.

Each transmitter provides its output signal, a replica of the data signal thereto, along a respective one of the highway pairs of transmission lines (one of which has its conductors indicated by the references $L_1$ and $L_2$) to a respective receiver at the receiving station.

The receiving station thus comprises N receivers and these receivers, denoted by the references $R_1$, $R_2$ . . . $R_N$, are each operable to produce digital output data signals in response to the signals they receive along their respective highway pairs from the associated transmitters.

Terminating resistors Z are connected across the highway pairs adjacent each transmitter and receiver for providing the correct termination at the ends of the data highway.

The input impedances of the receivers $R_1$, $R_2$ etc., and the output impedances of the transmitters $T_1$, $T_2$ etc., when non-operative, are high, and further similar receiving and transmitting stations may have their respective receivers and transmitters connected to the data highway so that data signals may be transmitted from any transmitting station to one, or more if desired, of the receiving stations. It will be appreciated that each such further receiving and transmitting station is respectively provided with N receivers and N transmitters connected individually to the highway pairs of transmission lines. For clarity, the connections between the data highway and only one further transmitting station and one further receiving station are indicated.

The operation of the transmitting station of FIG. 1 to transmit the input data signals along the data highway will become apparent from the following description, now to be given with reference to FIGS. 2 and 3, of the arrangement and operation of each of the transmitters $T_1$ to $T_N$.

Referring now to FIG. 2, each transmitter comprises two AND gates 10 and 11 each of which has one input provided by a respective one of the pulse generators $G_1$ or $G_2$ (FIG. 1).

Two npn transistors 12 and 13, have their base electrodes connected for receiving the outputs of the respective AND gates 10 and 11 and have their collector-emitter paths connected, in series with the primary windings 14 and 15 of respective isolating transformers 16 and 17, between earth and a +5 v. supply terminal 18.

An energy dissipation circuit comprising a diode 20 and a resistor 21 is connected in parallel with each winding 14 and 15 for dissipating energy inductively stored by the transformers 16 and 17 as is later to be described.

The secondary windings of the isolating transformers 16 and 17, respectively indicated by the reference numerals 22 and 23, are connected in parallel with one another through diodes 24 and 25 across the highway pair along which the transmitter provides its output.

Operation of the transmitter to transmit the input data signal along the highway pair by producing on the highway pair an output signal which is a replica of the input data signal is as follows:

The input data signal is a digital signal and is therefore formed of spaced pulses representative of data information to be transmitted. This signal is applied to both of the AND gates 10 and 11, to which are also applied the respective pulse trains continuously generated by the pulse generators $G_1$ and $G_2$.

FIG. 3 shows these two pulse trains and their phase relationship to one another. The trains have mark/space ratios of 2:1 and are phased relatively to one another by 180 degrees so that at any instant of time a pulse exists in at least one of the trains, an overlap being provided to allow for such factors as inaccurate phasing and pulse length.

Assuming that initially the generator $G_1$ is operative to produce an output pulse and that $G_2$ is providing no output, a pulse of the input data signal applied to the AND gates 10 and 11 causes the gate 10 to produce an output of fast rise time. This output renders the transistor 12 conductive so that the primary winding 14 of the transformer 16 is energised from the 5 v. supply at the terminal 18. In response to the voltage across the primary winding 14 the secondary winding 22 of the transformer 16 has induced in it a voltage such that the diode 24 is forward biased, and an output signal of fast rise time therefore appears across the highway pair.

The pulses from the generators $G_1$ and $G_2$ are of duration which is insufficient to cause their respective transformers 16 and 17 to saturate. The flux in the transformer 16 therefore increases substantially linearly while the pulse of the input data signal is present (and the pulse from the generator $G_1$ is present) and the output signal produced by the secondary winding of the transformer 16 therefore adopts a substantially constant voltage condition.

At the end of the pulse of the input data signal the transistor 12 becomes non-conductive and the voltage output from the transformer 16 accordingly drops substantially instantaneously to zero. It will thus be seen that across the highway pair is produced a square wave pulse which corresponds in duration to the pulse of the input data signal. While the pulse from the generator $G_1$ is still present, any further pulses of the input data signal will similarly result in the production of corresponding output pulses from the transformer 16.

When the generator $G_2$ is operative to produce an output pulse and the generator $G_1$ is non-operative, the transformer 17 operates in an identical manner to produce across the highway pair square wave output pulses corresponding to the pulses of the input data signal.

During a period of overlap, when the generators $G_1$ and $G_2$ are operative to produce simultaneous pulses, the transformers 15 and 16 operate in parallel so that the signal across the highway pair still conforms to the input data signal.

Thus there is produced across the highway pair an output signal formed of pulses which correspond to the pulses of the input data signal.

The energy dissipation circuits comprising the diodes 20 and the resistors 21 operate when the associated transformers are de-energised to dissipate the stored energy in the transformer windings. By so doing they ensure that the output pulses from the transmitter have fast rates of decay.

The diodes 24 and 25 prevent interaction between the isolating transformers when either is separately operative to produce a pulse. The diodes also provide the transmitter, when non-operative, with a high output impedance so that it has little or no attenuating effect on pulses generated on the highway pair by another transmitter connected to the pair.

A Zener diode 26 (FIG. 2) is connected across the highway pair to remove from the transmitted signal the voltage spikes which are produced by the transmitter when switching between the isolating transformers due to the leakage inductance in the transformers.

It will be appreciated that the repetition frequency of the input data signal is only limited by the rates of response of the circuit components and with modern components may be as high as 5 megahertz, particularly if integrated circuit components are used. There is no lower limit to the repetition frequency of the data signal and the transmitter can in fact operate with a constant voltage as the data signal.

The repetition rate of the pulse trains from the generators $G_1$ and $G_2$ is primarily determined by the characteristics of the transformers 16 and 17. The pulses should be of such duration that the flux in the transformer associated with the respective generator can increase in a substantially linear manner throughout the whole duration of each pulse. Preferably the repetition rate of the pulses is of the order of 500 kilohertz.

From FIG. 2 it will be seen that each transmitter will have a high common mode rejection capability, that is to say, it is so arranged that any signals produced on the associated highway pair and common to the two lines of the pair can not appreciably affect the operation of the transmitter and thereby cause spurious transmission.

The arrangement of each receiver $R_1$, $R_2$ etc. is of no relevance to the present invention and is therefore not described or illustrated. It will be appreciated, however, that each receiver is provided with a high input impedance and good common mode rejection so that these characteristics in the transmitters are well utilised.

Preferably each receiver is as shown and described in our copending British patent application No. 17,791/67 entitled "Digital Data Receivers."

Many arrangements of transmitting apparatus within the scope of the invention and other than that shown and described are possible, and it will be appreciated that the invention is not limited in application to the transmission of digital, i.e. two state, data signals but may also be applied to the transmission of data in analogue form.

The transmitter shown in FIG. 2 could, for example, be modified for transmitting a unidirectional analogue signal by replacing the AND gates 10 and 11 by gating devices each of which receives the analogue signal and passes the signal to the associated isolating transformer only when a pulse is present in the pulse train it receives from the respective transmitter $G_1$ or $G_2$.

It will be appreciated that when so modified the transmitter of FIG. 2 could effectively transmit bidirectional analogue data signals if a known D.C. bias is impressed on the signals beforehand such that the analogue data signal received and transmitted by the transmitter is unidirectional. The bias is removed at the receiving end of the transmission line to return the signal to its original form.

In applications of transmission apparatus in accordance with the invention where no unidirectionally conducting devices (such as the diodes 24, 25 of FIG. 2) are provided, a bidirectional analogue data signal can be transmitted directly (i.e. without biasing).

Although in the described embodiment only two pulse trains are used in the transmission of a data signal, it will be appreciated that this is only for convenience and simplicity and a transmitting apparatus in accordance with the invention may operate using three or more pulse trains. The transmitter shown in FIG. 2, for example, could readily be modified by the addition of a further AND gate, transistor and isolating transformer etc., for operation in response to three pulse trains which are cyclically effective to produce the output signal. As before, the pulse trains are such that at any instant of time a pulse is present in at least one pulse train, a period of overlap being preferably provided between pulses. Conveniently, as for the embodiment shown and described, the pulse trains are identical with regard to their repetition frequencies and mark/space ratios.

The signals from the gating devices constituted in FIG. 2 by the AND gates 10 and 11 can be used merely for controlling the energisation of the isolating transformers by means of variable impedance devices such as transistors (as shown), or they may themselves be used directly for providing the energisation. It will be appreciated that no energisation of an isolating transformer should occur in the absence of a pulse in the associated pulse train.

Although the transmitter particularly shown in FIG. 2 is described in its use in a computer interface, a data transmitting apparatus in accordance with the invention is not so limited in application, and may have wide application in the fields of line communication and data transmission.

I claim:

1. A data transmitting apparatus for producing at an output for transmission an output signal portraying a data signal received at an input, comprising at least two isolating transformer means each having an output winding and an input winding magnetically coupled to one another, the output windings being connected in a parallel manner across the output, a gating means for each transformer means, the gating means being connected for effecting energisation of the input windings of the transformer means and being each connected across the input for receiving the data signal, and a pulse generating means connected to the gating means for supplying separately thereto pulse trains having repetition frequency, mark/space ratio and relative phase such that at any instant of time during operation of the apparatus a pulse is present in at least one pulse train, each gating means being gated by the pulses of the respective pulse train to effect energisation of the associated said input winding in accordance with the data signal only when the pulses are present, in response to such intermittent energisation each transformer means being effective inductively to generate at its said output winding a pulsed signal which, during a pulse of the respective pulse train, portrays the data signal, the parallel connection of the output windings and the presence, at any instant of time, of a pulse in at least one said pulse train providing that across the output there is produced as the output signal, a signal which is formed of the pulsed signals superimposed in time relation and which portrays the data signal.

2. A data transmitting apparatus according to claim 1, wherein two transformer means are provided and connected to respective ones of two gating means.

3. A data transmitting apparatus according to claim 1 and adapted for receiving a said data signal which is unidirectional, which includes a unidirectionally conductive device individually connected in series with each said output winding for conduction when the output winding is energised.

4. A data transmitting apparatus according to claim 1 and adapted for transmitting a said data signal formed of first and second discrete states, wherein the said gating means are each constituted by an AND gate which is effective to energise the associated input winding only when there is present both a pulse in the respective pulse train and also a said first state of the data signal.

5. A data transmitting apparatus according to claim 4, which includes a variable impedance device for each transformer means, each variable impedance device being connected in a series circuit which includes the input winding of the associated transformer means, and direct current supply means connected across the series circuit, each variable impedance device being responsive to the output of the associated gating means accordingly to control the energisation of the transformer means.

6. A data transmitting apparatus according to claim 5, wherein each said variable impedance device comprises a transistor.

7. A data transmitting apparatus for producing at an output for transmission a digital output signal portraying a digital data signal received at an input and having first and second discrete states, comprising two isolating transformer means each having an input winding and an output winding magnetically coupled to one another, the output windings of the isolating transformer means being connected in parallel across the output and each having a unidirectionally conductive device connected in series therewith for conduction when the output winding is conductive, the input windings of the isolating transformer means being separately connected in series with the collector-emitter path of a respective transistor across a D.C. supply source, an AND gate for each isolating transformer means, each AND gate having its output connected to the base electrode of the respective transistor and having one input connected across the input of the apparatus for receiving the digital data signal, and a pulse generator for each AND gate, each pulse generator being connected for providing a second input to its respective AND gate and the two pulse generators being associated with one another for providing to the AND gates pulse trains of repetition frequency, mark/space ratio, and relative phase such that at any instant of time during operation of the apparatus a pulse is present in at least one pulse train, each AND gate being effective to energise the associated isolating transformer means by means of the respective transistor only when both the digital data signal has its first state and a pulse is present in the pulse train received, in response to such intermittent energisation each isolating transformer means being effective inductively to generate at its output winding a pulsed signal which, during a pulse of the respective pulse train, portrays the digital data signal, the parallel connection of the output windings and the presence, at any instant of time, of a pulse in at least one of the pulse trains providing that across the output there is produced, as the output signal, a signal which is formed of the pulsed signals superimposed in time relation and which portrays the data signal, the magnetic coupling between the apparatus input and output providing the apparatus with a good rejection of common mode signals impressed on its output, and the unidirectionally conductive devices preventing interaction between the transformer means at their outputs and providing the apparatus with a high input impedance to its output whereby two or more such apparatus may readily be made selectively to operate with their outputs connected in parallel.

8. A data transmitting apparatus according to claim 1, wherein a dissipating circuit is connected across the input winding of each transformer means for dissipating, during each period of null energisation of the associated transformer means, energy inductively stored in the transformer coupling means during the previous period of energisation.

References Cited

UNITED STATES PATENTS

| | | | |
|---|---|---|---|
| 2,164,383 | 7/1939 | Burton. | |
| 3,258,538 | 6/1966 | Searcy. | |
| 3,369,075 | 2/1968 | Yourke et al. | 178—68 |

RICHARD MURRAY, Primary Examiner

J. A. BRODSKY, Assistant Examiner

U.S. Cl. X.R.

178—70; 307—242